F. McCARROLL.
PLANE FOR AEROPLANES.
APPLICATION FILED NOV. 28, 1911.
1,152,426.
Patented Sept. 7, 1915.
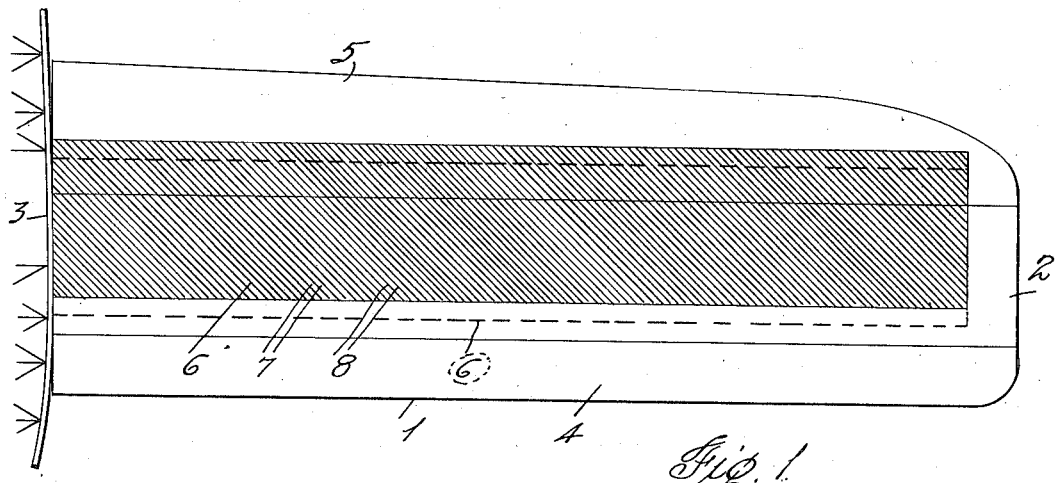
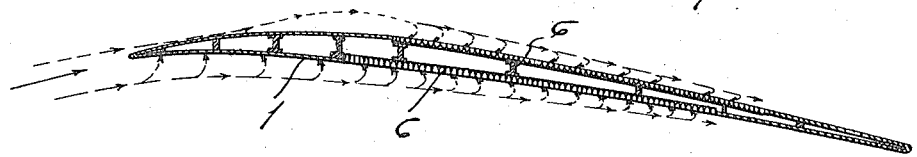
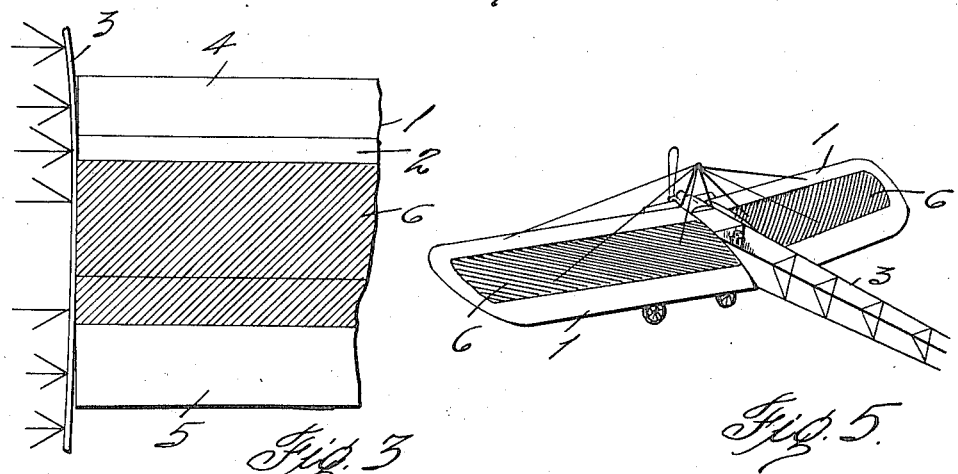
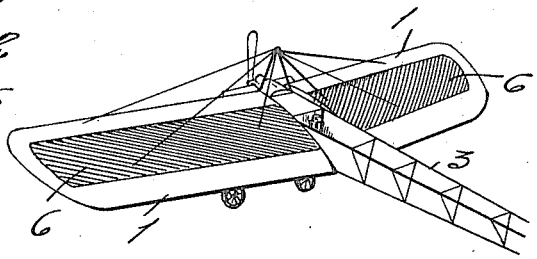
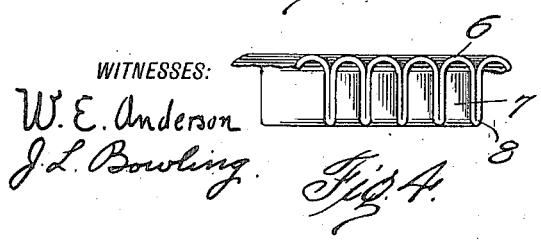
WITNESSES:
W. E. Anderson
J. L. Bowling
INVENTOR
Frank McCarroll.
BY
ATTORNEY

UNITED STATES PATENT OFFICE.

FRANK McCARROLL, OF DALLAS, TEXAS.

PLANE FOR AEROPLANES.

1,152,426.     Specification of Letters Patent.     Patented Sept. 7, 1915.

Application filed November 28, 1911. Serial No. 662,791.

*To all whom it may concern:*

Be it known that I, FRANK McCARROLL, citizen of the United States, residing at Dallas, in the county of Dallas and State of Texas, have invented certain new and useful Improvements in Planes for Aeroplanes, of which the following is a specification.

This invention relates to improvements in planes for aeroplanes.

As I shall make certain statements and claims which are to an extent contradictory to theories at present accepted as correct, something should be said to substantiate these statements and claims.

My invention pertains to soaring flight and I claim to have discovered the principle of soaring flight by birds, and further, believe I have correctly applied this principle to aeroplanes whereby the same may be made to soar without artificial power after the desired altitude has been attained through the agency of artificial or mechanical power.

Many years ago I began experimenting with birds and the wings of birds. I found that a buzzard's wing held with its front edge toward the wind is not blown backward, but instead is given a forward and upward thrust. Other objects were blown rearward. The wing was held substantially horizontal with its forward edge approximately at right angles to the general direction of the air current.

I gave much time to the study of bird wings and their construction. I found that a live bird with china silk pasted over its wings could not soar, yet when the silk was removed the bird was able to soar. By means of lint and down glued to a wing I discovered that soaring flight was accomplished through the agency of reversed air currents. I found that a current of air directed toward the wing struck the upper surface near the front edge, passed over a portion of the wing in a slight arc, and then encountered the central and rear portions of the upper surface in a reversed direction. Over the wing where the current passed in an arc, a vacuum was formed. The portion of the current encountering the under surface of the wing was also reversed, but in advance of the point of reversal on the upper surface. These experiments also demonstrated the fact that the center of lift or support of a bird's wing with relation to the load sustained, is approximately one-third from the front edge and two-thirds from the rear edge, thus there is a natural tendency toward a forward thrust. The greatest curvature of the wing is at the forward third and in flight the air "pockets" or collects under this portion. The air current passes in close proximity to the surfaces of the wing and while it is reversed sufficiently to impart a forward thrust, it is not completely reversed. Upon examining the wing of a soaring bird the under surface is found to be fluted or corrugated, but not to such an extent as to offer resistance to the forward movement of the bird. Such resistance is called "head" resistance.

An accepted and popular theory of soaring flight is that the bird utilizes ascending air currents, in fact depends upon them. I do not believe soaring flight depends upon ascending air currents. It is unreasonable to suppose that a bird rises to the required altitude and readily finds a convenient ascending air current made to order to carry him in the direction he has chosen. I claim that ascending air currents are utilized, but are not necessary.

My discoveries lead me to believe that soaring flight is accomplished by means of reversed air currents acting on the roughened surfaces of the bird's wings, that is the fluted surfaces provide projections which extend into the path of these currents. This flight is also due to a perfect equilibrium and particularly depends upon a minimum head resistance.

The object of my invention is to construct a plane or wing for aeroplanes arranged to reverse and utilize reversed air currents. Such a plane I believe should be curved from front to rear similar to the wing of a bird. A curved plane with smooth surfaces such as is now commonly used on aeroplanes has a tendency to reverse air currents which it encounters, but only utilizes the sustaining properties, no provision being made for utilizing the forward thrust. By providing a plurality of cavities or depressions in the upper and under surfaces of a plane having the necessary curvature the forward thrust resulting from reversed air currents may be utilized. These depressions or grooves are arranged at an angle so that the air currents will take a better "grip" on the wing. The angle may be varied.

In a co-pending application, filed November 3rd, 1911, Serial Number 658,328, I have illustrated an aeroplane having sectional planes whereby the curvature from front to rear may be increased or diminished and also have shown in said application a running gear adapted to be swung up into the body to reduce head resistance the same as a bird swings its legs up against its body for the same purpose. The invention set forth in this application may be applied to either a rigid or flexible plane or wing, or to a wing having hinged sections.

With the above and other objects in view, the invention has relation to certain novel features of construction and operation, an example of which is described in the following specification, and illustrated in the accompanying drawings, wherein:

Figure 1 is a plan view of a monoplane wing showing the upper surface arranged in accordance with the invention herein described, Fig. 2 is a transverse sectional view of a plane arranged in accordance with the invention, and air currents indicated by dotted lines, Fig. 3 is a partial underside view of the plane shown in Fig. 1, Fig. 4 is a detail of the current utilizing construction, and Fig. 5 is a perspective view of a portion of a monoplane equipped with the invention.

In the drawings the numeral 1 designates the planes or wings of a monoplane. In Figs. 1 and 3 a wing is shown having a central portion 2 fixed to the body 3 of the monoplane. Front and rear sections 4 and 5 respectively are hinged longitudinally to the fixed section. This wing is constructed substantially the same as shown and described in the co-pending application hereinbefore mentioned, except as to the additions herein set forth. Such a wing has a particular advantage as its curvature may be varied and its hinged sections may be adjusted to maintain and restore lateral equilibrium. In Figs. 2 and 5 ordinary rigid or flexible wings are illustrated and these wings have no hinged sections.

It is to be understood that an aeroplane equipped with this invention must have suitable means such as a suitable engine and propeller for gaining the proper altitude. A soaring bird attains his altitude by vigorously swinging his wings, but upon reaching it spreads the wings and soars away without any perceptible wing movement. The momentum thus obtained upon reaching the altitude is sufficient to reverse the air currents which impinge the surfaces of the wings and these reversed currents delivering a forward thrust furnish the power which carries the bird onward. To fully understand and appreciate this principle one must lose sight of any connection with the earth as the travel is through air or space with relation to air currents and not fixed matter such as the earth. In Fig. 2 the dotted lines show how the air currents are reversed and the portions of the wing 1 on which they act. It will be noted that those currents striking the forward under surface of the wing exert an upward thrust and the forward thrust is increased proportionately toward the rear end. Only the central and rear portions of the upper surface of the wing is acted upon by the reversed currents. At the portions where the air currents are reversed I have provided depressed constructions 6. These constructions comprise a plurality of recesses 7, each recess being separated from the next one by walls or projections 8. Another way to describe this would be to say that a plurality of pockets is formed and the reversed currents entering these pockets and delivering a forward thrust supply the power which imparts a forward movement to the wing. In the drawings these recesses or pockets are enlarged as in actual practice they are about one-eighth of an inch wide, but this dimension may be varied. The recesses are made inward from the surfaces of the wing so that the walls 8 will not project and offer head resistance. It will be noted that the under construction 6 is placed in advance of the construction on the top surface. As hereinbefore stated the air currents create a vacuum over the forward portion of the upper surface. The vacuum being present the atmospheric pressure on the forward upper surface is thus relieved and consequently a greater load may be sustained at the forward portion of the wing.

The construction 6 may be formed of any suitable material such as thin metal, paper compositions and fiber, or any other material which is found desirable and satisfactory. It is to be noted that this invention may be applied to any aeroplane irrespective of its particular construction.

I claim soaring flight may be accomplished by an aeroplane having properly curved planes, the surfaces of which will reverse air currents when the machine has obtained a considerable horizontal speed, provided the planes are so constructed as to utilize the forward thrust resulting from the reversed air currents. Such a machine must also have means whereby it may be maintained in a balanced position and the head resistance must be reduced to a minimum. The curvature of the wings not only reverses the air currents but causes the greater portion of the load to be carried at the forward portions of the wings and thus a tendency toward a forward thrust is had. It is apparent that ascending air currents may be used to reach a higher altitude.

While I have shown depressions on both the upper and under surfaces of the plane I am of the opinion that it might be possible to eliminate the depressions on the upper surface for the reason that the depressions in the under surface may be sufficient to attain the desired results.

What I claim is:

1. A plane for aeroplanes, provided with corrugated surface sections, said corrugated sections being formed so that the extending parts of the corrugations forming the sections are in the same plane as the main surfaces of the plane, and marginal portions of the main surface extending around the corrugated sections.

2. A plane for aeroplanes, provided with corrugated sections in its surfaces, said corrugated sections being formed in the upper and lower surfaces of the plane, and having the extending parts of the corrugations forming the sections substantially in the same planes as the main surfaces of the plane.

3. A plane for aeroplanes, provided with corrugated surface sections countersunk with relation to the surfaces of the plane portions and having the extending edges of the corrugations in the same plane as the surfaces.

4. A plane for aeroplanes, comprising a body having corrugations on its upper and under surfaces, said surfaces being spaced apart and said corrugations being countersunk with relation to the plane surfaces, and the corrugations on one surface extending relatively beyond the corrugations on the other.

In testimony whereof I have signed my name to this specification in the presence of two subscribing witnesses.

FRANK McCARROLL.

Witnesses:
 TOWNE YOUNG,
 G. C. NELSON.